Dec. 30, 1924.
H. N. ROTHWEILER
AUTOMOBILE BRAKE SHOE
Filed Nov. 16, 1922
1,520,967
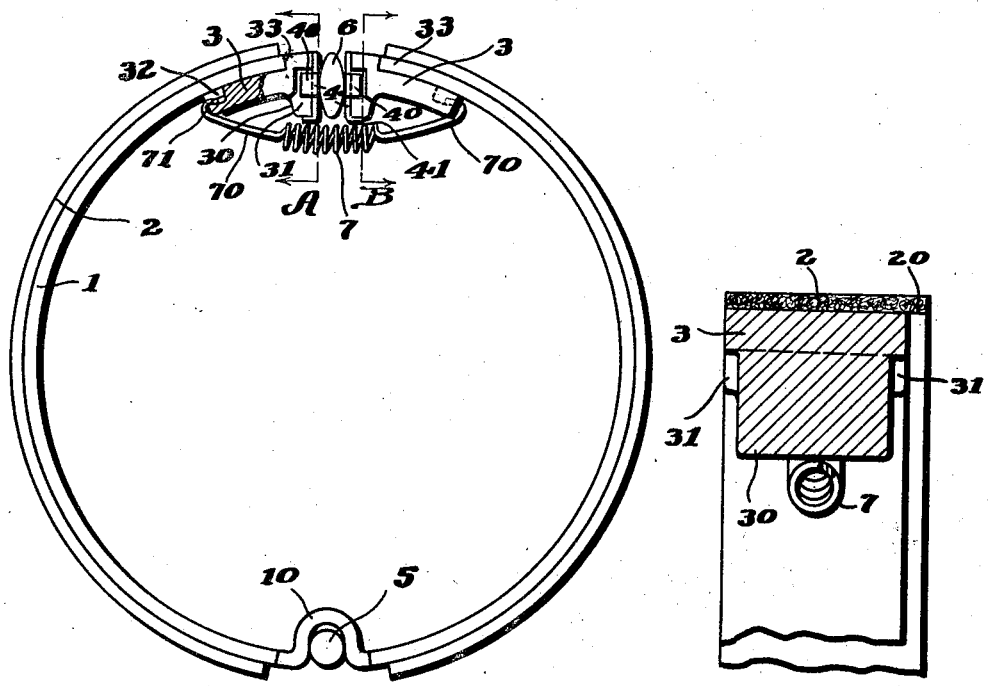
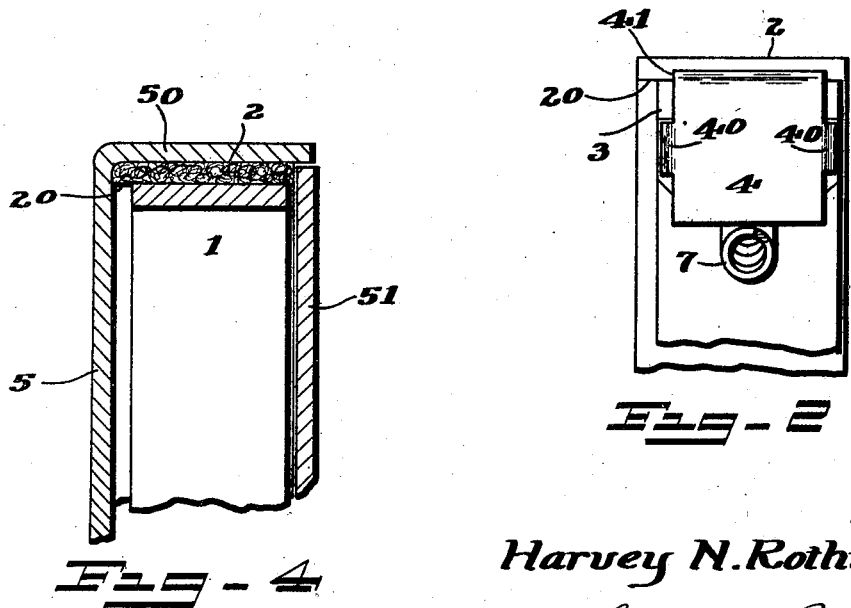
Inventor
Harvey N. Rothweiler Patented Dec. 30, 1924.

1,520,967

UNITED STATES PATENT OFFICE.

HARVEY N. ROTHWEILER, OF SEATTLE, WASHINGTON.

AUTOMOBILE BRAKE SHOE.

Application filed November 16, 1922. Serial No. 601,275.

*To all whom it may concern:*

Be it known that I, HARVEY N. ROTHWEILER, a citizen of the United States of America, and resident of the city of Seattle, in the county of King and State of Washington, have invented certain new and useful Improvements in Automobile Brake Shoes, of which the following is a specification.

My invention relates to expansion brakes such as are quite generally used on automobiles.

The object of my invention is to provide a brake of this character which will contain certain improvements, making of the same a better brake, and by which certain objections to the brake as ordinarily constructed may be eliminated.

The invention will be hereinafter described and the parts thereof which I believe to be new and upon which I desire to secure patent will be particularly pointed out in the claims.

The accompanying drawings illustrate a preferred embodiment of my invention.

Figure 1 is a side view of the brake band separate from the casing in which it is placed.

Figure 2 is a view of one end of the brake band, with the wear plate thereon.

Figure 3 is a section taken upon the line B of Figure 1.

Figure 4 is a transverse section taken through the brake band at an intermediate point, showing also in section, a portion of the enclosing casing.

The brake band illustrated consists of a bar 1 of flat cross section having at a point central of the length of the band, an inwardly projecting U-shaped bend 10 which is adapted to embrace an anchoring pin 5 so as to prevent rotation of the brake band. The bar 1 of which this ring is made, is not stiffened or enlarged in any way at or adjacent to this bend. In fact it is desired that this bend should have a small measure of resiliency which will be brought into action when the brake is expanded or contracted as in use. This bar or ring is provided with an exterior lining 2 of friction producing and durable material.

In this type of brake bands as ordinarily installed in cars the liner 2 is made either the same or substantially the same width as the ring 1. In use there is a certain measure of looseness in the fit of these within the surrounding casing. A section of such a casing is shown in Figure 4, 5 being the side plate or disk and 50 the peripheral flange. This casing is normally secured to and turns with the wheel, while a side plate 51 which carries the anchor bolt 5 is fixed against rotation. In a brake having the relative width of the band 1 and liner 2 referred to, the slight looseness which generally is found between these parts will cause the edge of the ring 1 to bear against the sides of the casing, thus producing scraping or rattling. With the object of preventing this I make the ring 1 sufficiently narrower than the liner 2 that the liner will project at one edge, as shown at 20. This edge of the liner will contact with the side of the casing, and not being metal, will not produce any noise nor will it produce wear in the same way as would the metal. The liner may also project slightly at the other edge of the ring.

The ends of the ring 1 are provided with abutment plates or members 3 secured thereto. These are provided with removable wear plates 4. The abutment members 3 are provided with recesses 31 in their side faces into which fit ears 40 turned down from the edge of the wear plates 4. These wear plates are also provided with a flange, as 41, which engages under the inner edge of the downward projection 31 or overlaps the outer edge of the head of the abutment member 3, as may be desired. These are held in place against movement sidewise by the ears 40 and against movement inward by engaging with the spring 7, which has its ends extended and provided with a hook as 71 which engages in recesses 32 formed in the outer ends of the abutment members 3. These recesses may be formed in the abutment member when the same is cast, if it be cast, or forged therein when it is made if it is forged.

It is not designed that the wear plates 4 be used when the brake lining is new but be applied after the brake lining has been worn down so that the action of the cam 6 will not sufficiently expand the brake to secure effective brake action. By their use the brake lining may be more nearly worn out.

The wear plates 4 may be inserted in reverse position from that shown in Figure 1, that is, with the flanges 41 overlapping the outer or peripheral surface of the abutment pieces 3, as has been indicated in Figure 3.

What I claim as my invention is:

1. An adjusting device for expansible brake bands comprising wear plates adapted to cover the ends of the bands and having a flange adapted to fit over either peripheral face of the band.

2. An adjusting and wear plate for the ends of expansible brake bands comprising a plate having arms adapted to embrace the sides and either the outer or the inner peripheral surfaces of the brake band ends.

3. A facing for the ends of expansible brake bands comprising a plate having flanges adapted to engage the sides and a peripheral face of the ends of said bands.

4. A shim for the ends of expansion brakes comprising a facing plate having ears at two opposite edges adapted to embrace the sides of the brake band end, and a flange at one other edge adapted to overlap the brake band end.

5. An expansion brake having abutment pieces upon its end provided at their sides with ear-receiving recesses and shims adapted to cover the end faces of said abutment pieces and having ears overlapping the side edges and seating in said recesses.

Signed at Seattle, King County, Washington, this 8th day of November, 1922.

HARVEY N. ROTHWEILER.